United States Patent
Krymski et al.

(10) Patent No.: US 7,573,516 B2
(45) Date of Patent: *Aug. 11, 2009

(54) LOOK AHEAD ROLLING SHUTTER SYSTEM IN CMOS SENSORS

(75) Inventors: Alexander I. Krymski, Montrose, CA (US); Kwang-Bo Cho, Los Angeles, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 845 days.

This patent is subject to a terminal disclaimer.

(21) Appl. No.: 10/958,592

(22) Filed: Oct. 6, 2004

(65) Prior Publication Data

US 2005/0057674 A1 Mar. 17, 2005

Related U.S. Application Data

(63) Continuation of application No. 09/773,400, filed on Jan. 31, 2001, now Pat. No. 6,809,766, which is a continuation-in-part of application No. 09/038,888, filed on Mar. 11, 1998, now Pat. No. 6,529,242.

(60) Provisional application No. 60/179,378, filed on Jan. 31, 2000.

(51) Int. Cl.
*H04N 5/335* (2006.01)
*G03B 7/00* (2006.01)

(52) U.S. Cl. .................. 348/296; 348/308; 348/362

(58) Field of Classification Search ............... 348/296, 348/308, 362, 206

See application file for complete search history.

(56) References Cited

U.S. PATENT DOCUMENTS

| 4,819,070 | A |   | 4/1989 | Hynecek |
|---|---|---|---|---|
| 5,410,348 | A | * | 4/1995 | Hamasaki ............. 348/296 |
| 5,541,654 | A |   | 7/1996 | Roberts |
| 5,949,483 | A | * | 9/1999 | Fossum et al. ......... 348/303 |
| 6,088,058 | A | * | 7/2000 | Mead et al. ........... 348/296 |
| 6,115,065 | A | * | 9/2000 | Yadid-Pecht et al. ... 348/308 |
| 6,243,134 | B1 | * | 6/2001 | Beiley ................... 348/308 |
| 6,529,242 | B1 |   | 3/2003 | Panicacci |

* cited by examiner

*Primary Examiner*—Nhan T Tran
*Assistant Examiner*—Mekonnen Dagnew
(74) *Attorney, Agent, or Firm*—Dickstein Shapiro LLP

(57) ABSTRACT

A shutter system for a pixel array is disclosed. The system includes a read shift register, first and second reset shift registers, and a plurality of logic gates. The read shift register is configured to sequentially count rows of the pixel array from top to bottom, such that the read shift register generates a read pointer. The first reset shift register is configured to sequentially reset rows of the pixel array from top to bottom. The first reset shift register provides a first reset pointer for allowing reset of pixels in a row indicated by the first reset pointer. The first reset pointer allows reset of pixels prior to reading of the pixels in a row indicated by the read pointer. The time difference between the first reset pointer and the read pointer indicates an exposure time. The second reset shift register is configured to provide a second reset pointer, which enables the first reset shift register to sequentially reset rows of the pixel array without generating any flashes when the exposure time is increased. The plurality of logic gates direct outputs of the read shift register and the first and second reset shift registers to each pixel in the pixel array.

16 Claims, 13 Drawing Sheets

LOOK AHEAD ROLLING SHUTTER SYSTEM IN CMOS SENSORS

CROSS-REFERENCE TO RELATED APPLICATION

This application is a continuation of Non-provisional application Ser. No. 09/773,400, filed Jan. 31, 2001, now U.S. Pat. No. 6,809,766 itself a continuation-in-part of U.S. Non-provisional application Ser. No. 09/038,888, filed Mar. 11, 1998, now U.S. Pat. No. 6,529,242, issued Mar. 4, 2003, and entitled "Look Ahead Shutter Pointer Allowing Realtime Exposure Control." This application and application Ser No. 09/773,400 also claim benefit of the priority of U.S. Provisional Application Ser. No. 60/179,378 filed Jan. 31, 2000 and entitled "Compact Realization of 2-Reset Pointer Roller Shutter in CMOS Sensor." The contents of these applications are incorporated herein by reference.

BACKGROUND

This specification generally relates to a CMOS sensor, and more particularly to a look-ahead shutter system in such a sensor.

Complementary metal-oxide semiconductor (CMOS) active pixel sensor (APS) technology is an integrated circuit technology for electronically capturing images, therefore forming an "electronic film." Unlike charge-coupled device (CCD) image sensors that have been used in the past to capture electronic images, the CMOS sensors use mainstream microelectronic fabrication processes to produce the sensor chips. The advantages of the CMOS APS technology are low cost, small size, and have an ability to integrate a significant amount of very-large-scale-integrated (VLSI) electronics on-chip.

In a CMOS APS device, each pixel of an image sensor array has both a photodetector and an active transistor circuitry for readout of the pixel signal. The photodetector for each pixel in the image sensor array converts photons impinging on the pixel to an electric charge via the photoelectric effect. The charge is integrated over a period of time that is long enough to collect a detectable amount of charge but short enough to avoid saturating storage elements. This period is analogous to a film exposure time (i.e. the shutter speed) and is called an integration time. In the image sensor array of the CMOS APS device, the integration time is the time between a reset of a given row and a subsequent read of the row. Since only one row can be selected at a time, the reset/read routine is sequential (i.e. row by tow). This routine is referred to as a "rolling electronic shutter." The integration time may be adjusted by a fixed amount as a result of an image exposure analysis using an average intensity scheme or image histogram measurements. The shutter width is the time between integration enable and readout. This may be of any size depending on the number of adjacent pixels that will have the same integration time. The shutter width may also be adjusted by a fixed value to control the gain of an exposed area of a sensor array.

To realize an integration time shorter than one frame time, a particular row needs to be accessed at some given time before the readout. The accessed row needs to be reset to start a new integration. Thus, a reset pointer moves ahead of a read pointer by an amount equal to the shutter width. The time difference between the two pointers is the integration time.

However, when the integration time is adjusted dynamically, the integration process may encounter some difficulties in implementing the change. For example, when the integration time is increased, the reset pointer needs to jump to the beginning of the frame without completing the previous reset cycle. This may be seen as an artifact or a short flash in the bottom portion of the image.

SUMMARY

The present disclosure includes a shutter system for a pixel array. The system includes a read shift register, first and second reset shift registers, and a plurality of logic gates.

The read shift register is configured to sequentially count rows of the pixel array from top to bottom, such that the read shift register generates a read pointer. The first reset shift register is configured to sequentially reset rows of the pixel array from top to bottom. The first reset shift register provides a first reset pointer for allowing reset of pixels in a row indicated by the first reset pointer. The first reset pointer allows reset of pixels prior to reading of the pixels in a row indicated by the read pointer. The time difference between the first reset pointer and the read pointer indicates an exposure time. The second reset shift register is configured to provide a second reset pointer, which enables the first reset shift register to sequentially reset rows of the pixel array without generating any flashes when the exposure time is increased. The plurality of logic gates direct outputs of the read shift register and the first and second reset shift registers to each pixel in the pixel array.

DESCRIPTION OF DRAWINGS

These and other features and advantages of the invention will become more apparent upon reading the following detailed description and upon reference to the accompanying drawings.

DETAILED DESCRIPTION

In recognition of the above-described difficulties, the present disclosure describes a two-reset pointer rolling shutter system.

Figure 1:
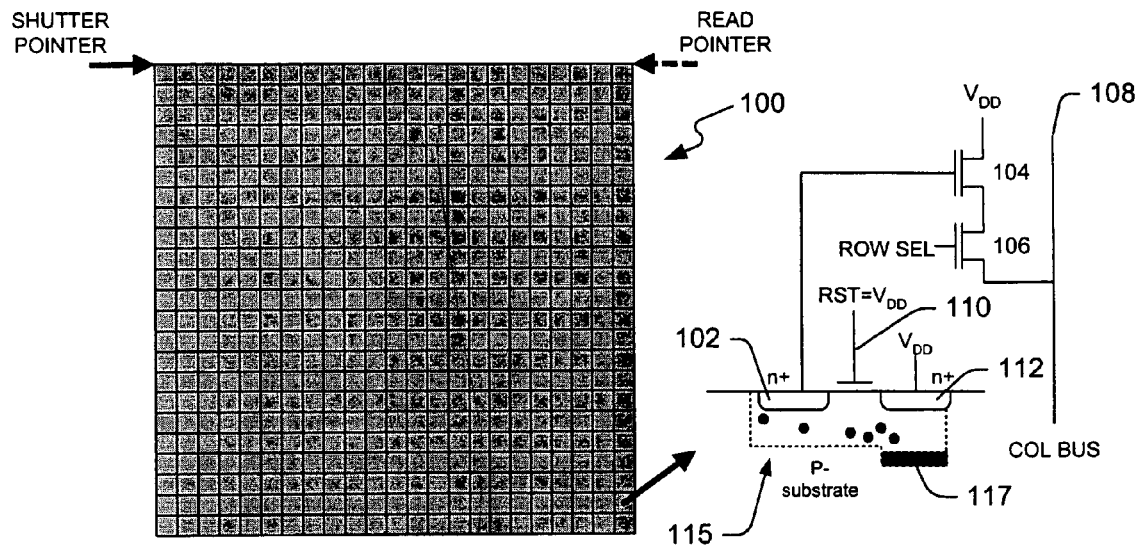
FIG. 1 shows the system with the shutter closed and the array and the reset stayed.

FIG. 1 shows a block diagram of the active pixel sensor (APS) array, along with a sample schematic of the way the array may operate. While the system shows a photodiode pixel, it should be understood that the technique applies to any kind of pixel including, for example, a photo-gate pixel or any other photo-receptor.

When the array is in the reset state, the APS array 100 shows all pixels as being shaded, meaning that all are in the "don't care" state.

The pixels are collectively sampled into an A/D converter using a system with a floating diffusion 102 that is sampled into a source follower 104. The output of the source follower 104 is also sampled through a row selector transistor 106 onto column bus 108. The column bus 108 is coupled into the A/D converter array described herein.

In FIG. 1, the shutter is closed and thus the gate 110 is in the reset state. The row is reset by providing a $V_{DD}$ potential on the gate 110 that connects the floating diffusion 102 to a sink well 112. When the reset value is released, the floating diffusion 102 can accumulate charge from incoming photo-carriers. The potentials of the various elements are shown in state diagram 115: all incoming photo-carriers are sinked to the well 117.

Figure 2:
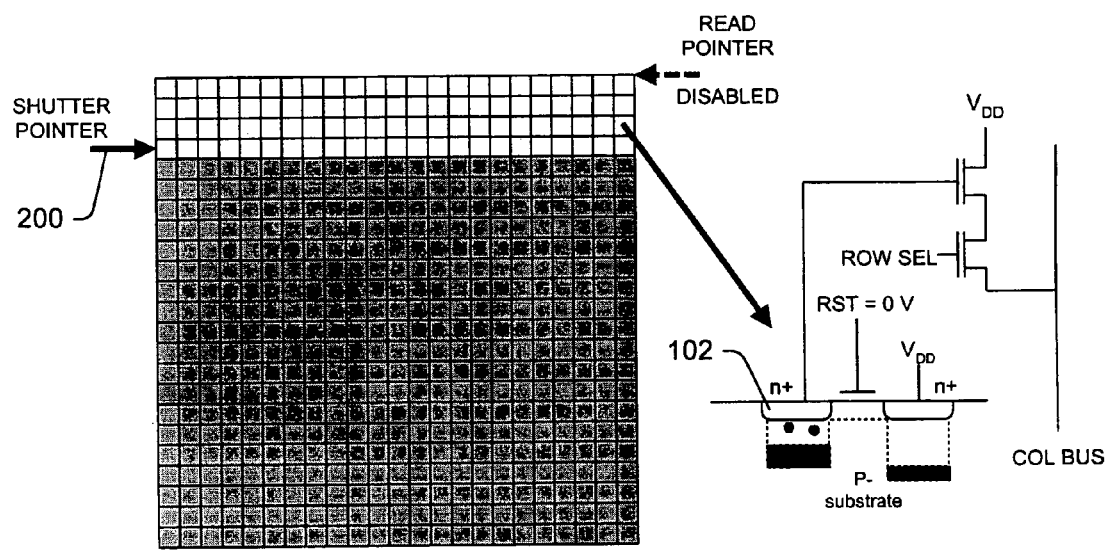
FIG. 2 shows the start of exposure.

In FIG. 2, the exposure has been started. This may be done by advancing the shutter counter through the array selectively releasing the array from reset. The rate at which the opening is advanced through the array is the same as the read row rate. The operation occurs by releasing the reset to each row in a timed manner. The timing may be controlled by a controller that may be dedicated logic or a microprocessor.

FIG. 2 shows how the states change when reset is released. Each floating diffusion begins to integrate charge once released. The read pointer is disabled, to avoid any false reads.

In this example of FIG. 2, row 4, shown by pointer 200, is being advanced cyclically. Therefore, row 1 has been opened for the time of 4 clock rate exposures.

Figure 3:
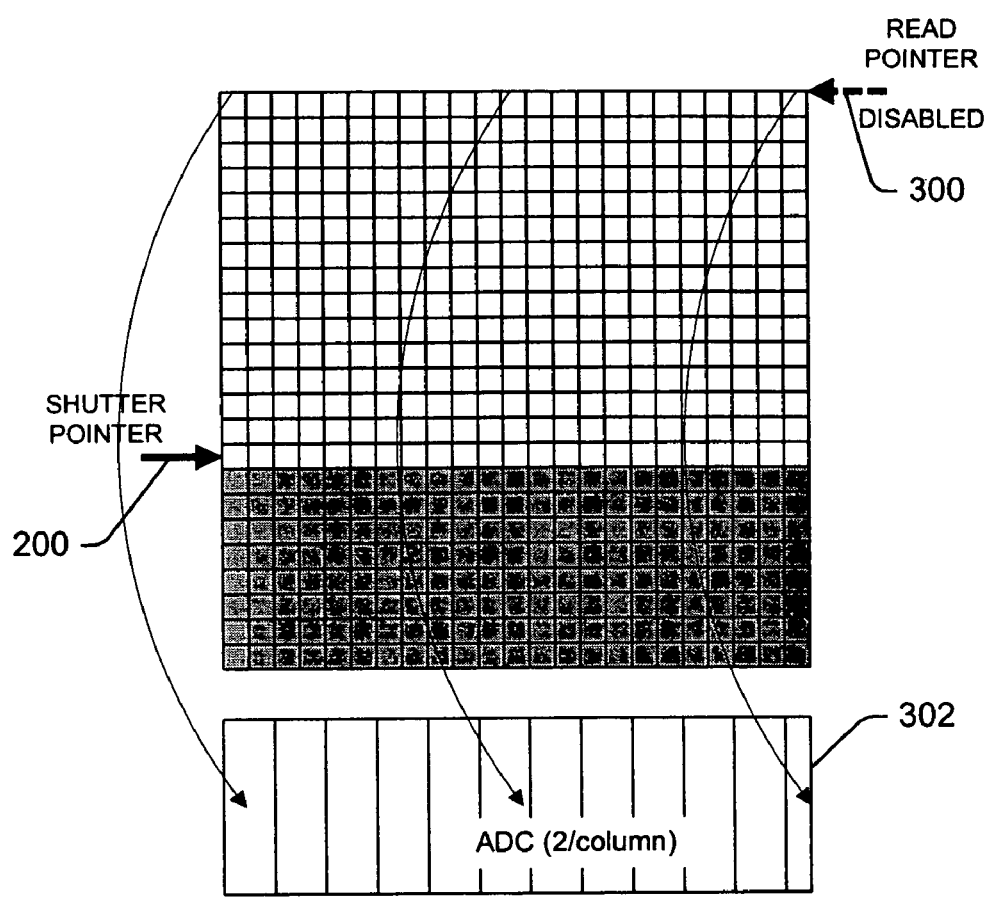
FIG. 3 shows the advance of the shutter.

FIG. 3 shows the operation continuing. Pointer 200 has now reached the 15th row and in this example, we assume that 15 exposure cycles are desired. At this point, the read pointer 154 is enabled; shown as element 300. The enabling of read pointer 300 enables the row select 106 and thereby provides the charge from that row onto the column bus 108 into associated A/D converter 302. In this example, therefore, the first row of the array is read into the column processing A/D circuits. The shutter advancing speed matches the row processing speed. Here, the shutter width equals 14 rows and the pixel integration time equals 14 times the process time per row.

After reading out the row, the reset for that particular row is again brought active to maintain the pixel in reset.

Figure 4:
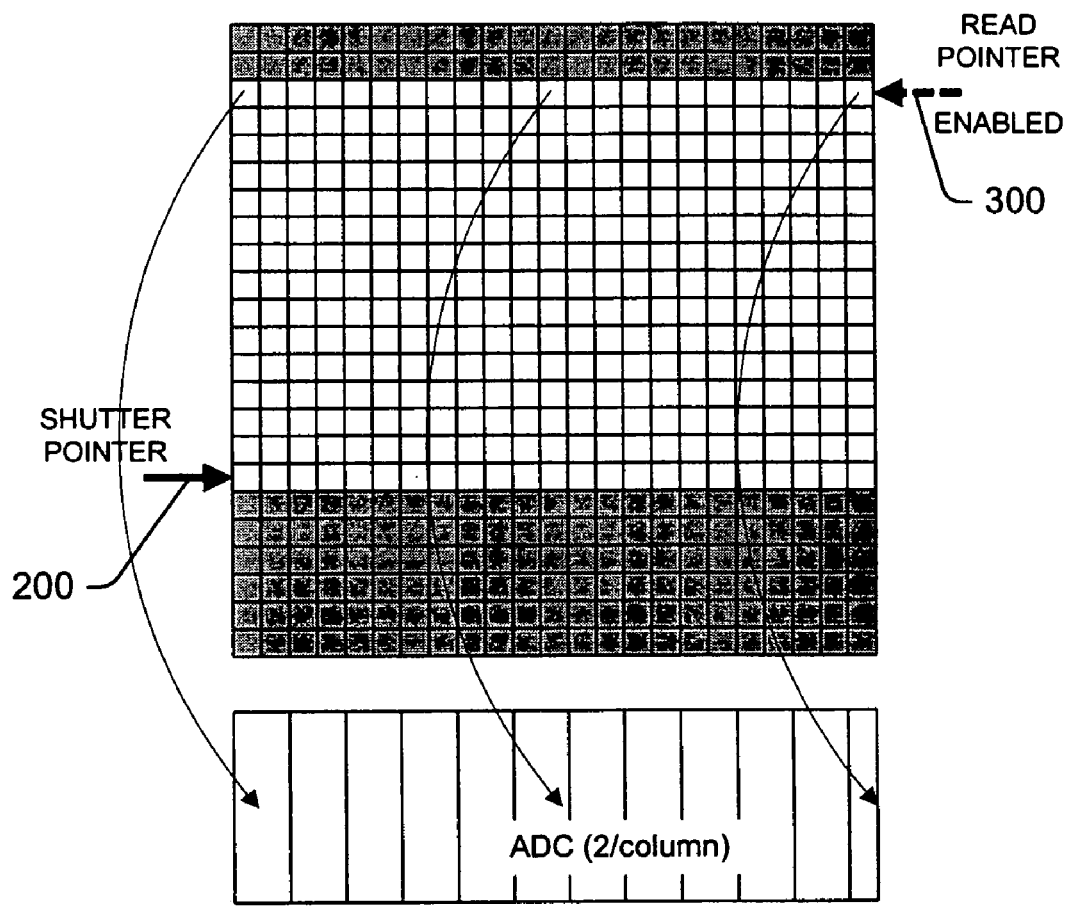
FIG. 4 shows how each row is read into an analog to digital converter and the shutter is closed behind it.

FIG. 4 shows the continuation of the process. The read pointer 300 is always 15 rows behind the shutter pointer 200. Thus, the shutter pointer 200 may be referred to as a reset pointer. Each row is read into the A/D converter, and the shutter is closed behind it by bringing the appropriate reset transistor 110 into reset.

Figure 5:
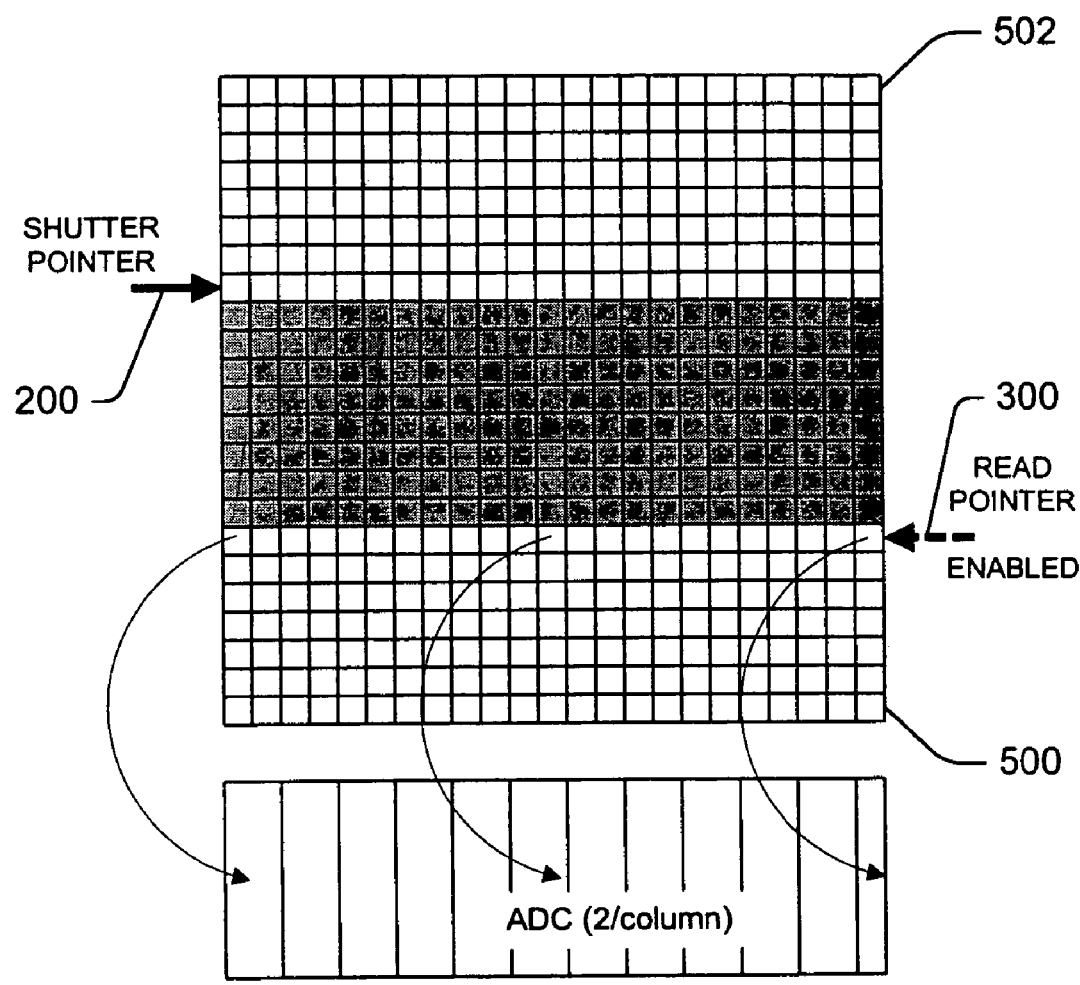
FIG. 5 shows the positions of the read pointer and shutter pointer as the process continues.

FIG. 5 shows the way in which the pointers wrap around. When the shutter pointer reaches the bottom 500 of the array, it wraps back around to the top 502 of the array. The read pointer continues to read behind the time of the shutter pointer enablement.

Figure 6:
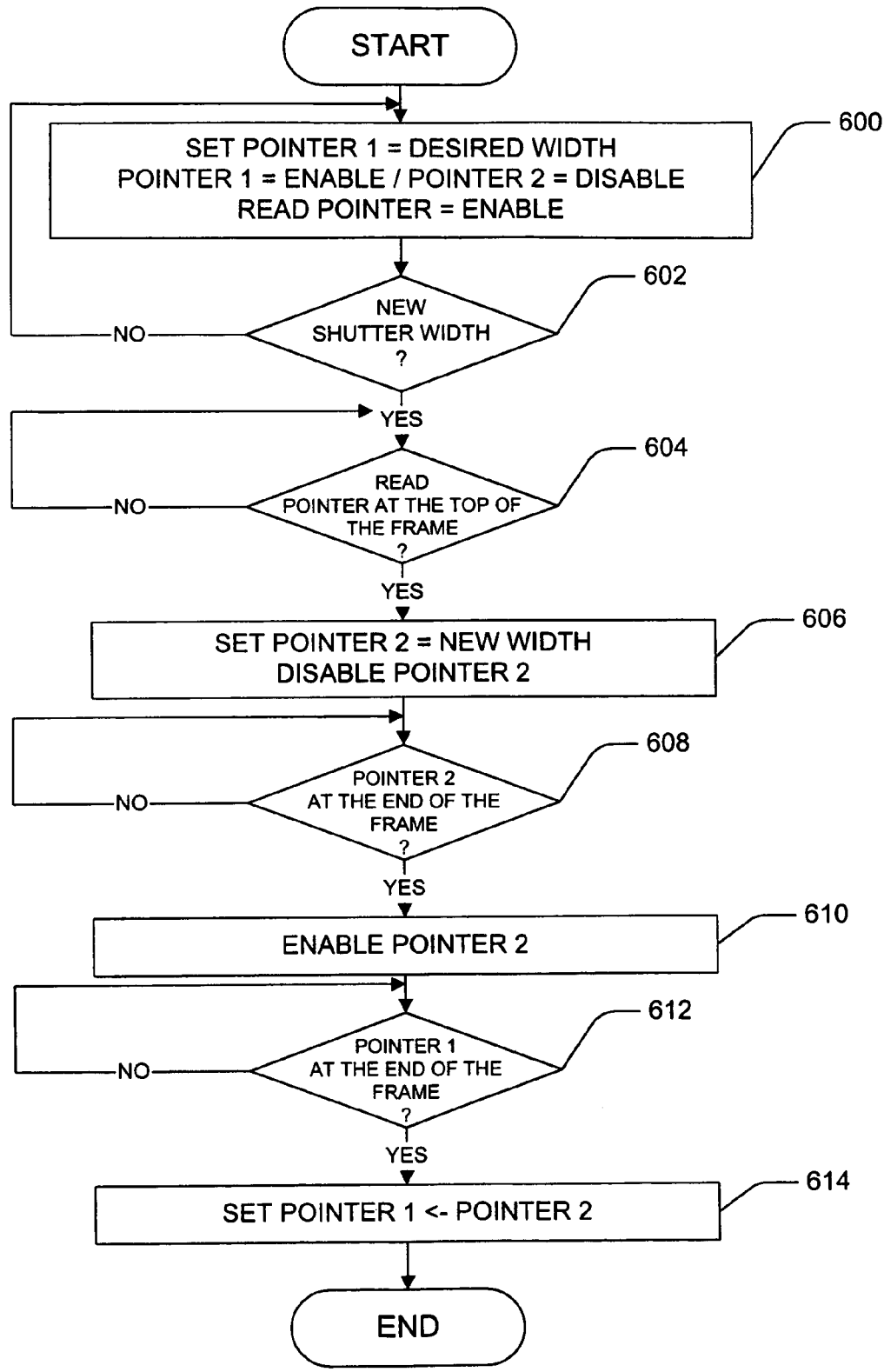
FIG. 6 shows the process of selecting a new shutter width in a flowchart.
Figure 7:
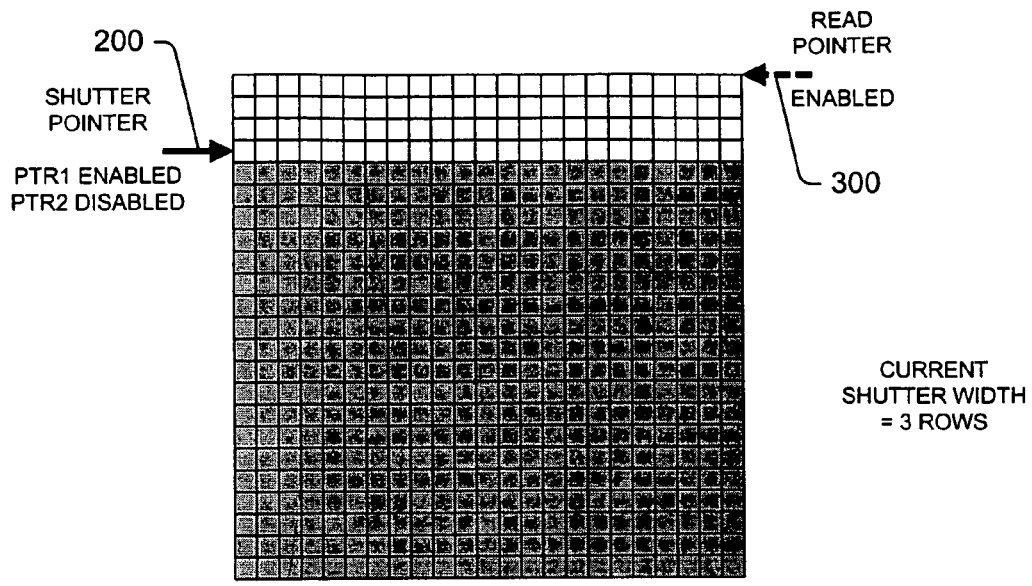
FIG. 7 shows the first step in a process of changing the exposure.

The operation of selecting a new shutter width is shown in the flowchart of FIG. 6 and with reference to FIGS. 7-15. FIG. 7 shows the beginning of a new frame. As shown at 600 in the flowchart of FIG. 6, the shutter pointer 1 is set to the desired width, pointer 2 is disabled, and the read pointer is enabled. The read pointer tells the pixels to be read a specified amount of time after the shutter pointer has enabled them. FIG. 7 shows the system operating with the current shutter width of three rows.

Figure 8:
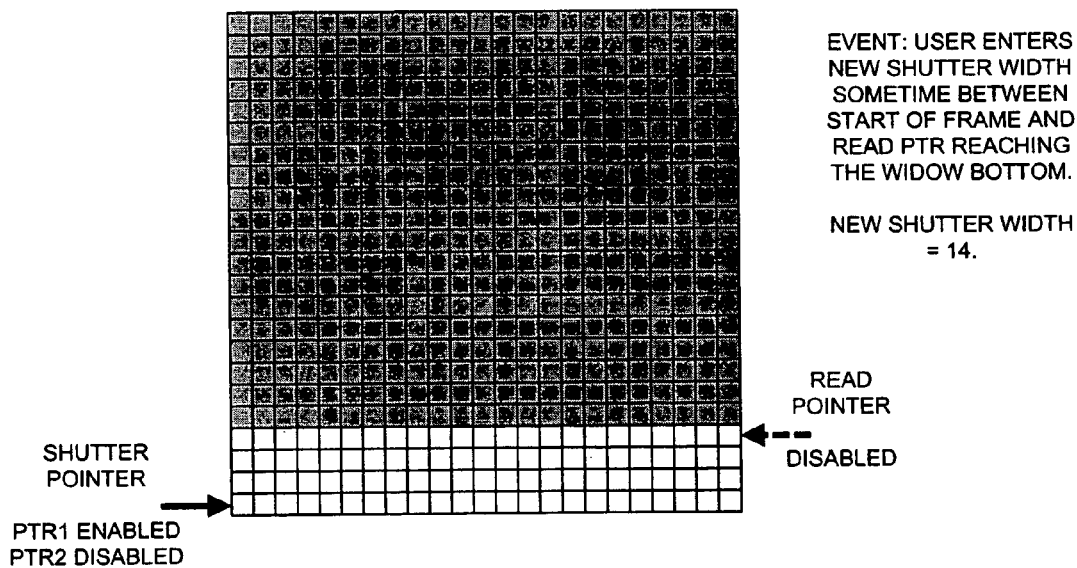
FIG. 8 shows the shutter conditions at the bottom of that window.
Figure 9:
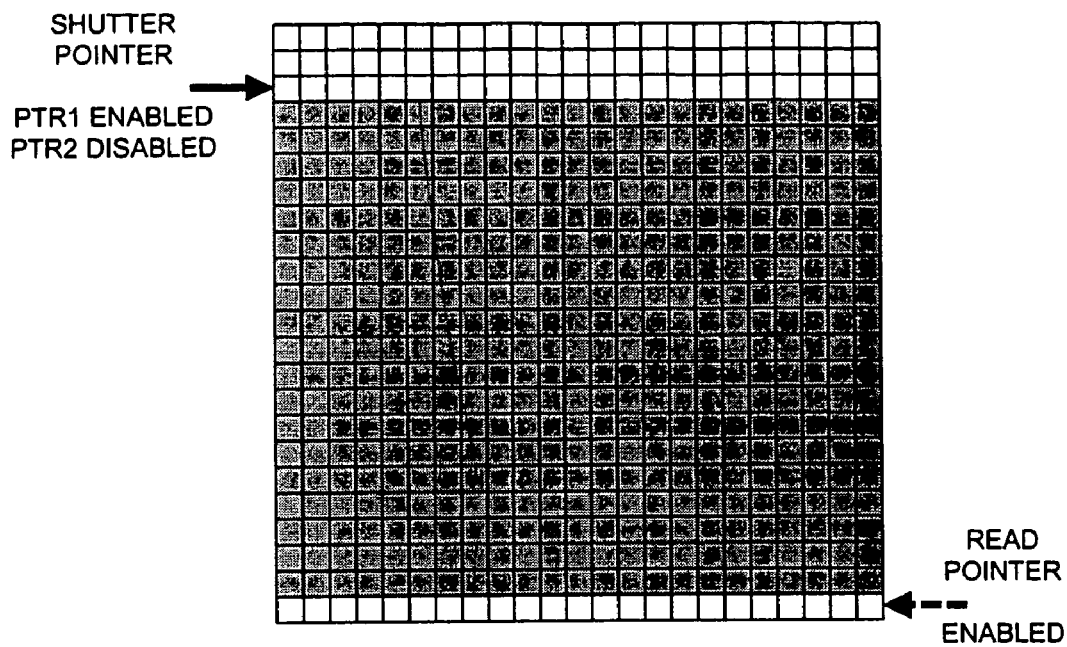
FIG. 9 shows the bottom of the window and the beginning of the next window.
Figure 10:
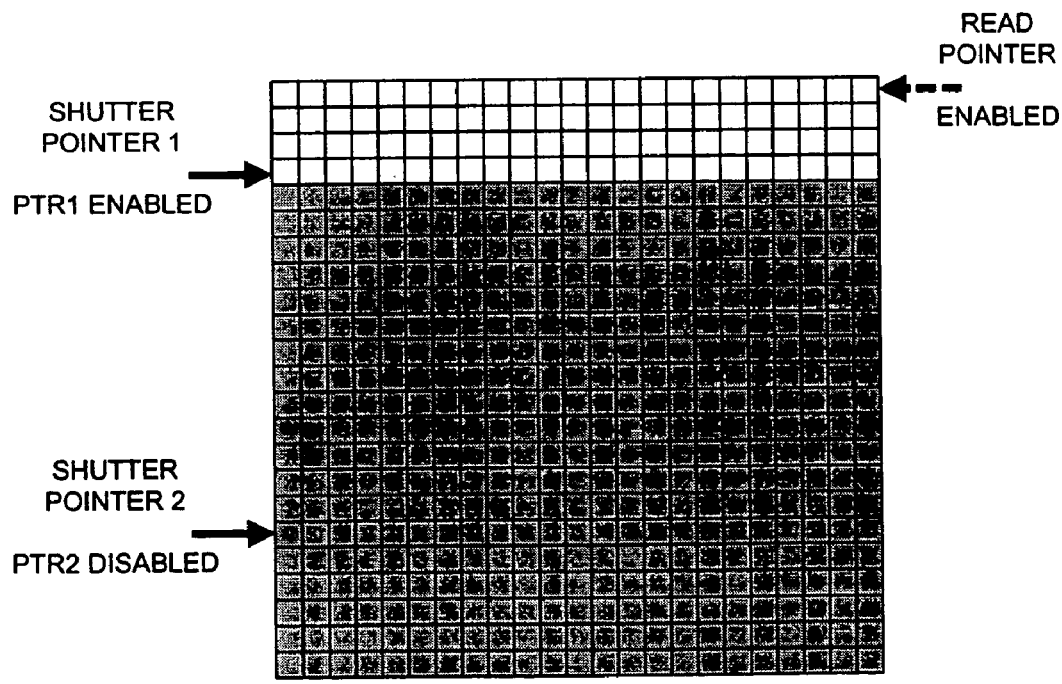
FIG. 10 shows the complete new frame with the set up shutter width.
Figure 11:
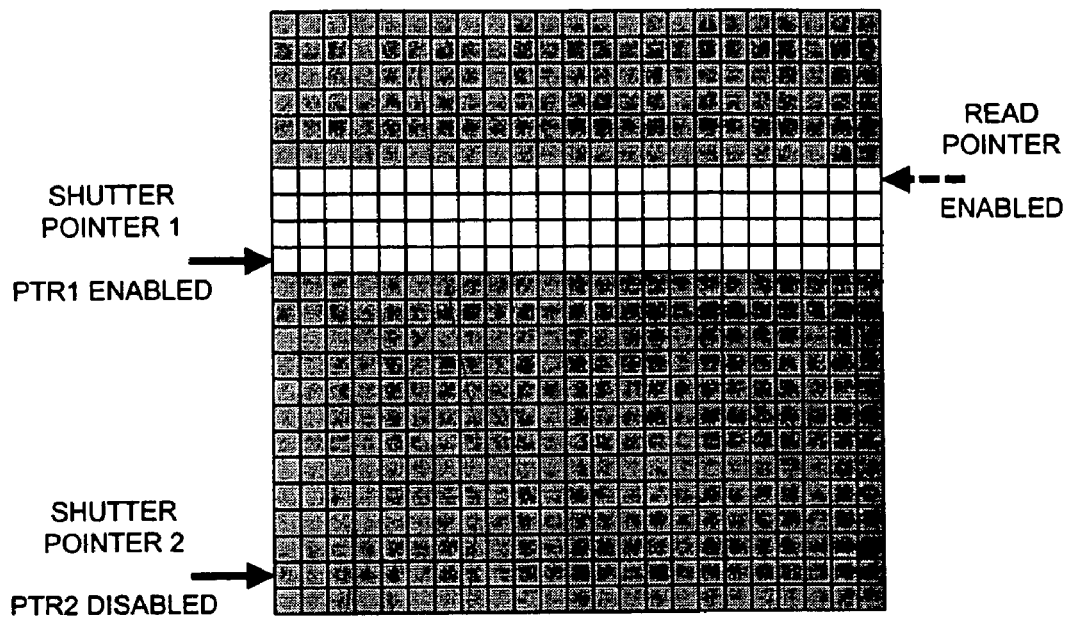
FIG. 11 shows continuation of the reading.
Figure 12:
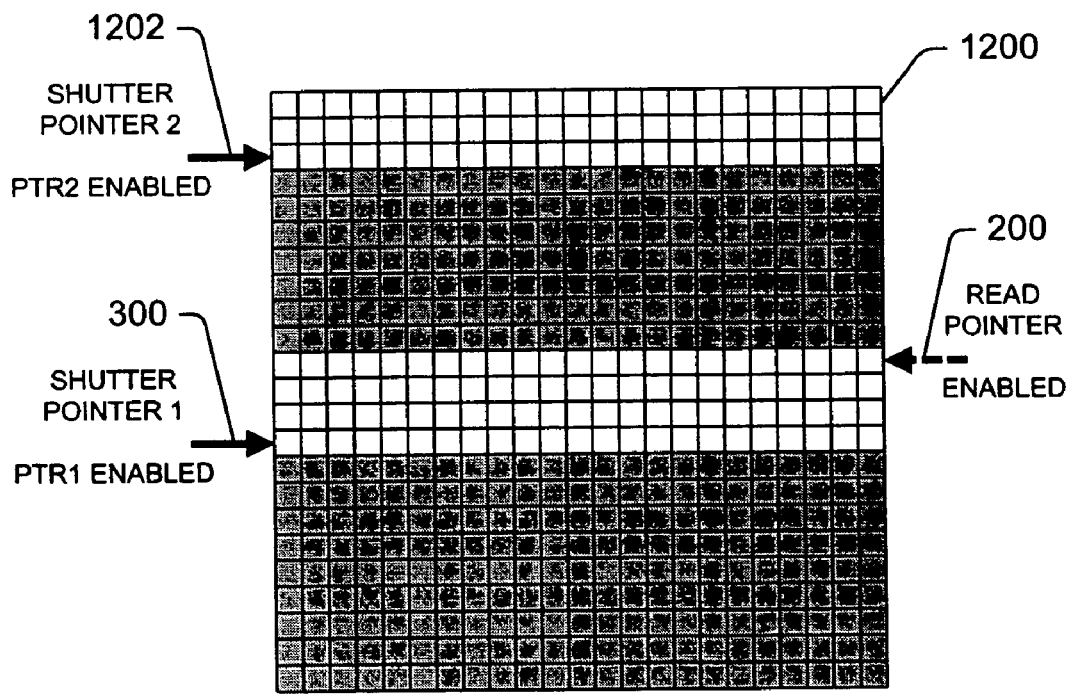
FIG. 12 shows the new pointer initiating a new shutter width.
Figure 13:
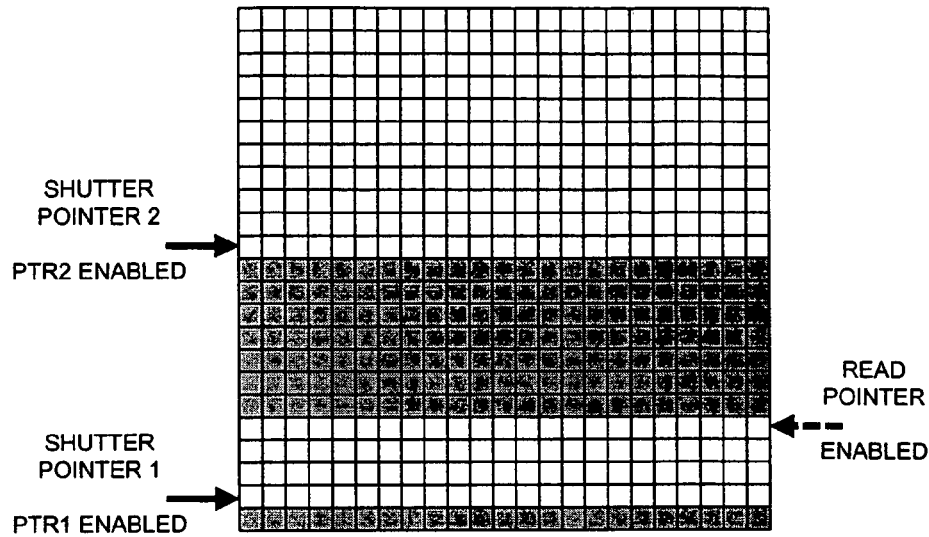
FIG. 13 shows the continuation of the reading with both shutters enabled.
Figure 14:
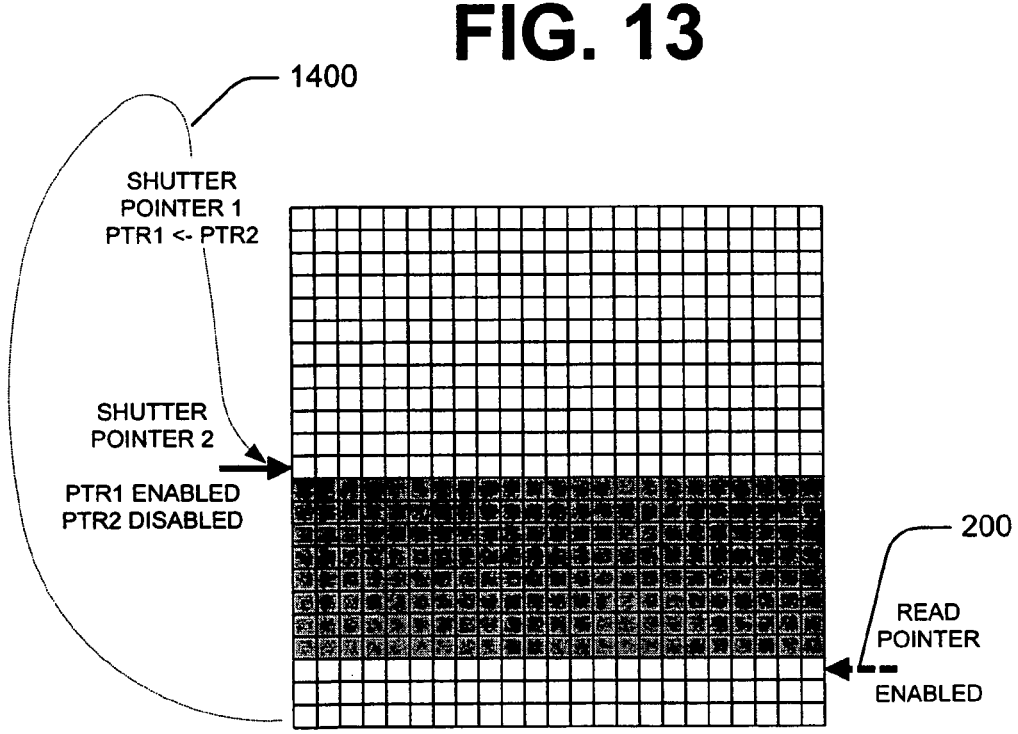
FIG. 14 shows the first shutter pointer wrapping around loaded with the second shutter pointer value.
Figure 15:
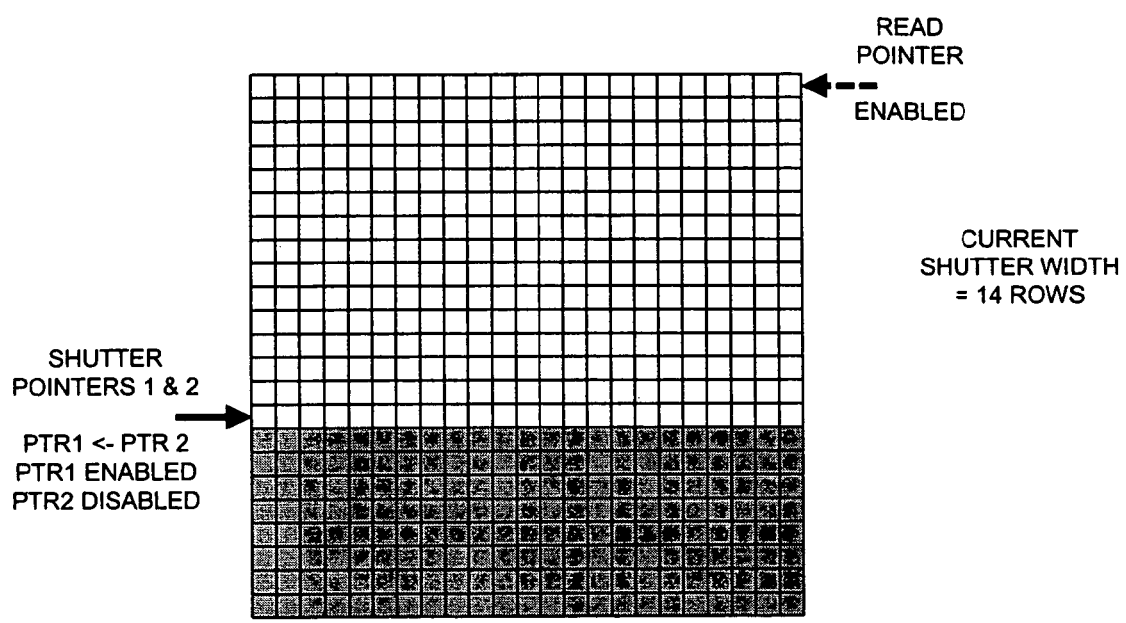
FIG. 15 shows the new frame starting with the updated shutter width.

Some time after the operation of FIG. 7, the user enters a new shutter width at 602. The new shutter width in this example is 14 rows although it could be any value. FIG. 8 shows the shutter pointer reaching the bottom of the frame. FIG. 9 shows the read pointer reaching the bottom of the frame and FIG. 10 shows the read pointer reaching the top of the frame. When the read pointer reaches the top, as detected at 604, the shutter pointer 2 is set to the new width. However, pointer 2 remains disabled at this time and through the subject of FIG. 11 where it moves in step with pointer 1 and the read pointer. This is represented as 606 in FIG. 6. When the shutter pointer 2 reaches the end of the frame, as detected at 608 and shown in FIGS. 11 and 12, it is enabled to initiate the new shutter width. The read pointer 200 is still reading three rows behind the shutter pointer 1 (300). However, subsequent top rows such as 1200 are being turned on by shutter pointer 2 (1202). This is shown generally as 610 in FIG. 6. The reads continue, as shown in FIG. 13. When pointer 1 reaches the bottom of the frame, 612 in FIG. 14, pointer 1 receives the contents of pointer 2 (614) and wraps around loaded with the value of pointer 2 (1400). Therefore, when the read pointer 200 reaches the bottom of the frame, the bottom-most row receives the last three-row exposure. The top of the next frame, shown in FIG. 15, has a 14-row shutter width.

Figure 16A:
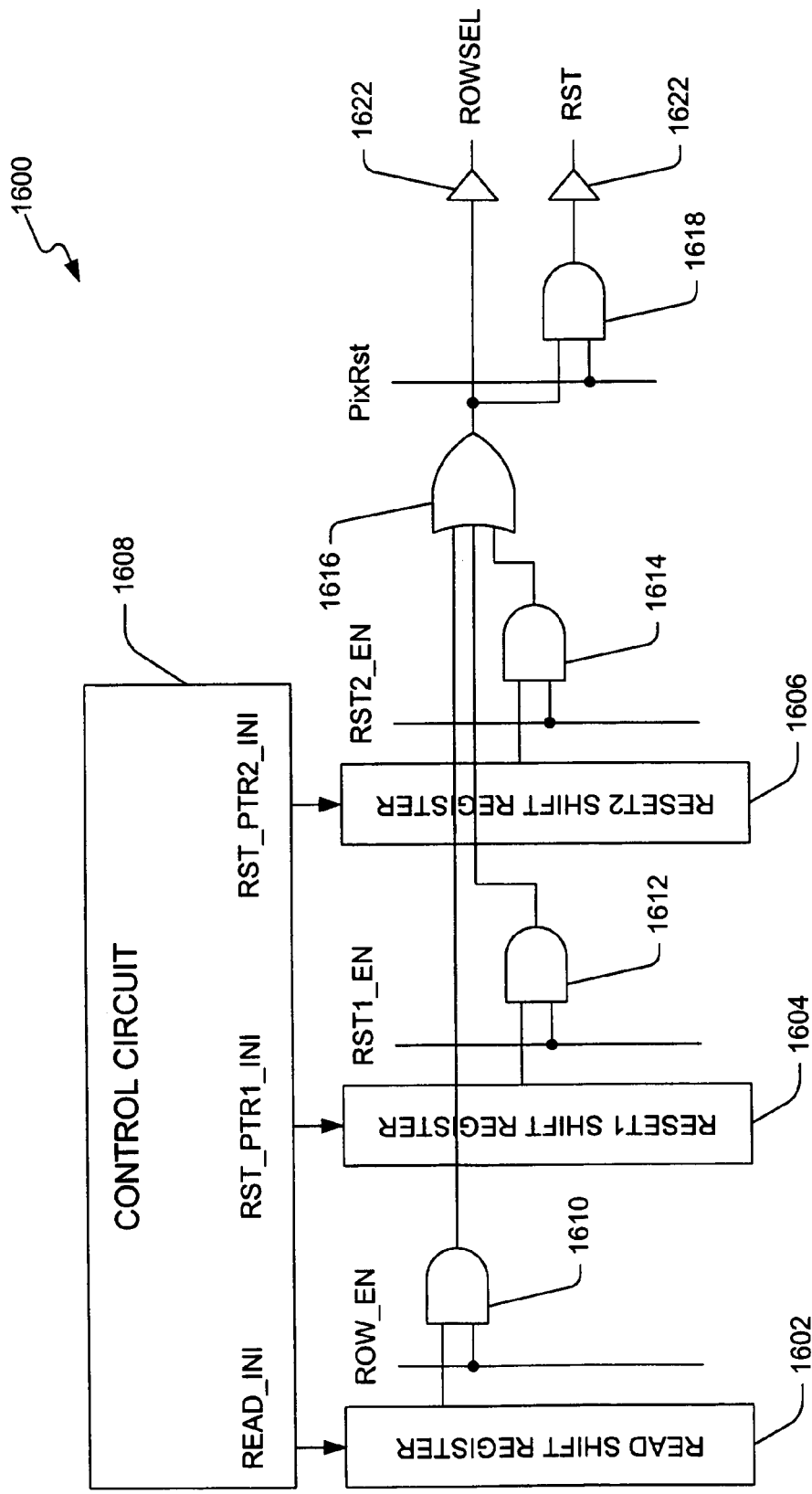
FIG. 16A illustrates a circuit realization of a two-pointer reset operation.

FIG. 16A illustrates a circuit realization of a two-pointer reset operation described above. The illustrated embodiment shows a rolling shutter system 1600 having two reset pointers in accordance with an embodiment of the present disclosure. The system 1600 includes a control circuit 1608, dynamic shift registers 1602, 1604, 1606, and logic gates 1610-1622 that direct the shift register data to pixels in each row. The configuration of the system 1600, as shown, circumvents the need for address calculations.

Figure 16B:
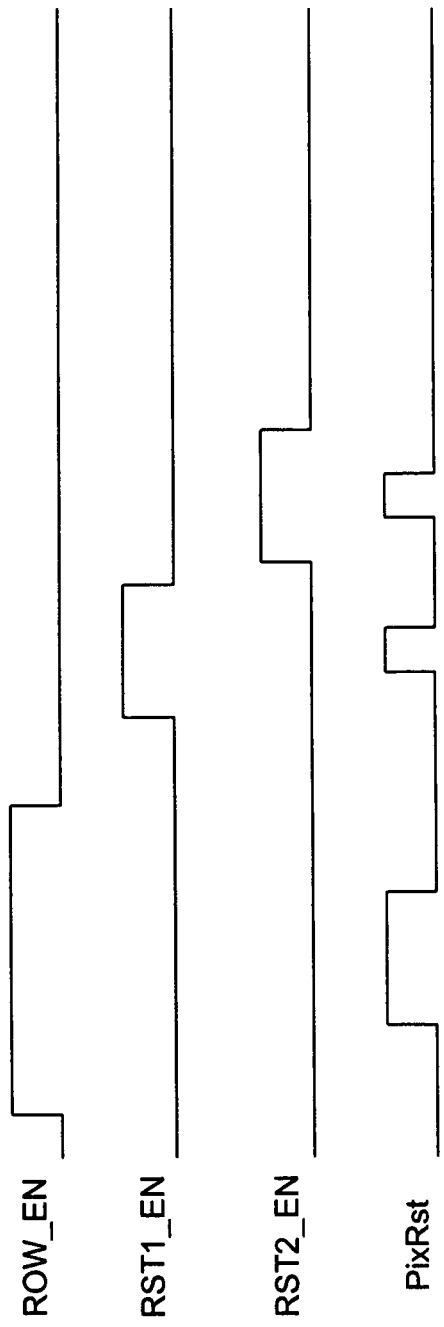
FIG. 16B illustrates timing diagrams of the two-pointer reset operation.

The read process starts with READ_INI signal, from the control circuit 1608, applied to a read shift register 1602 at the start of a new frame. By initializing the read shift register 1602 with READ_INI, the rows are sequentially selected from the top of the frame. Once a particular row is selected for read operation, ROW_EN signal is pulsed (see FIG. 16B) for the duration sufficient to complete the standard pixel read operation, as described above in conjunction with schematic diagrams of FIGS. 1 and 2. A pixel reset is performed during this read operation by applying PixRst signal as shown in FIG. 16B. When both ROW_EN and PixRst signals are at logic high, a given pixel in the selected row is reset. The AND gate 1610 selectively passes output of the read shift register 1610 during ROW_EN. The AND gate 1618 allows pixel reset when the PixRst signal is applied during ROW_EN.

The reset process may be initiated by either RST_PTR1_INI or RST_PTR2_INI. RST_PTR1_INI signal initializes the first reset shift register 1604, while RST_PTR2_INI signal initializes the second reset shift register 1606. The first reset shift register 1604 may be used as a default reset register.

Pulsing RST1_EN signal, and applying PixRst signal through a row driver in the selected row may initiate the rolling reset sequence. When the second reset shift register 1606 is selected as a default reset register, the reset sequence may be initiated by applying PixRst signal while RST2_EN signal is active. See FIG. 16B for the timing details of the above-described sequence. The AND gate 1612 selectively passes output of the first reset shift register 1604 during RST1_EN. The AND gate 1614 selectively passes output of the second reset shift register 1606 during RST2_EN. The OR gate 1616 provides enabled shift register outputs to the next stage to select or reset a row. Buffers 1620, 1622 provide buffering of data for row select and reset, respectively. Signals, ROWSEL and RST, are directed to pixels to control the gates as shown in FIGS. 1 and 2.

When the integration time (or shutter width) is dynamically increased in a particular frame compared to that of the previous frame, a two-pointer reset process may be started by initializing the second shift register 1606. The process may be started by initializing the first shift register 1604 when the default reset shift register is the second shift register 1606. The "increase in the integration time" condition is equivalent to the current reset shift register being in a "busy" condition. If the integration time (i.e. exposure time) is updated incrementally, then the first condition may be easier to implement. If the integration time is programmed, then the second condition may be easier to implement. Either of these conditions may serve as an indicator to alternate the reset shift register. For example, if the first reset shift register 1604 is currently enabled, the first reset shift register 1604 is disabled and the second reset shift register 1606 enabled, and visa versa.

Figure 17:
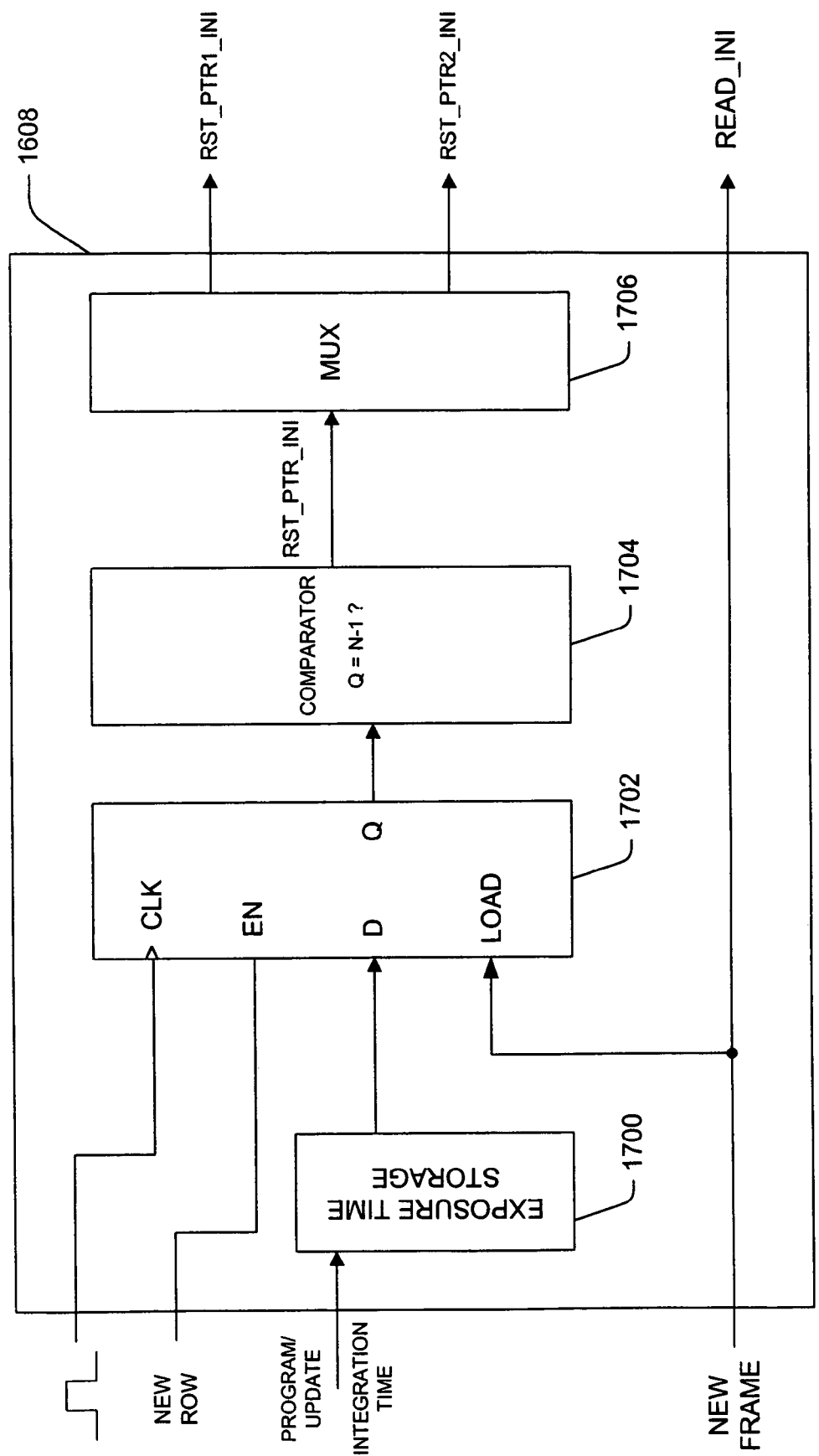
FIG. 17 is a block diagram of a control circuit that performs rolling reset operation.

FIG. 17 is a block diagram of a control circuit 1608 that performs rolling reset operation. The circuit 1608 includes an exposure time register 1700, a delay counter 1702, a comparator 1704, and a multiplexer 1706.

The exposure time storage 1700 may be programmed, or updated once a frame with an integration time. In one embodiment, the integration time may be configured as a row width. When the time is programmed to a fixed value, the storage 1700 may include a memory or buffer. When the time is updated sequentially the storage 1700 may include a counter.

The delay counter 1702 operates to start counting from the loaded integration time value until the count has reached a value of one less than the number of rows in a frame (i.e. N-1). Since the counter 1702 is loaded with an integration time value (e.g. shutter width expressed in terms of number of rows) at the beginning of a frame, the delay counter 1702 operates to count rows up to a row that is a shutter width away from the end of the frame, before the reset initialization pulse is issued. The comparator 1704 performs this task by issuing RST_PTR_INI when it detects that the output of the counter 1702 has reached N-1.

The multiplexer 1706 directs the reset initialization pulse, RST_PTR_INI, to either first 1604 or second reset shift register 1606, depending on which reset shift register was previously enabled. Thus, the multiplexer 1706 operates to alternate the direction of RST_PTR_INI.

While specific embodiments of the invention have been illustrated and described, other embodiments and variations are possible. For example, although the illustrated embodiments show only a limited number of examples for the configuration of two-reset rolling shutter system, other examples involving more than two reset pointers are envisioned to provide similar functions.

Further, although the embodiments show the resetting and reading of pixel array being done in one row at a time, these operations may be performed in units that are less than one row. For example, a row may be divided into 8 segments, and each of the read pointer and the reset pointers may be updated according to these segments within the row.

All these are intended to be encompassed by the following claims.

The invention claimed is:

1. A method of operating a shutter system for an image sensor, comprising:
    sequentially selecting rows of a frame from top to bottom and outputting a first pointer for reading a row of pixels;
    using at least two reset pointers contemporaneously, including second and third pointers, for resetting rows of pixels; and
    directing said first, second, and third pointers to respective pixel rows in the image sensor.

2. The method of claim 1, further comprising:
    storing an exposure time;
    determining when during the exposure time the second pointer reaches the bottom of the frame, and
    outputting a reset pointer initialization signal to indicate that the second pointer has reached the bottom of the frame.

3. The method of claim 2, further comprising:
    alternately directing said reset pointer initialization signal to reset the second and third pointers, such that the reset pointer initialization signal is directed to reset the second pointer when the signal is directed to reset the third pointer in a previous cycle, and the reset pointer initialization signal is directed to reset the third pointer when the signal was directed to reset the second pointer in the previous cycle.

4. The method of claim 2, further comprising programming and storing the exposure time as a fixed value.

5. The method of claim 2, further comprising updating the exposure time sequentially with each frame.

6. The method of claim 1, further comprising selectively enabling the first pointer register for durations sufficient to complete a pixel read operation.

7. The method of claim 6, further comprising selectively enabling the second and third pointers for durations sufficient to complete a pixel reset operation.

8. The method of claim 7, further comprising detecting the first, second, and third pointers to control a row select signal of a pixel.

9. The method of claim 8, further comprising detecting a fourth pointer with the first, second, and third pointers to control a row select signal of a pixel.

10. A method of changing exposure time in an image sensor array comprising:
    setting a first shutter pointer to a first width;
    enabling the first shutter pointer;
    enabling a read pointer;
    entering a second width different from the first width;
    setting a second shutter pointer to the second width when the read pointer reaches a top of a frame of the image sensor array; and
    enabling the second shutter pointer when the second shutter pointer reaches the bottom of the frame to initiate the second shutter width.

11. The method of claim 10, further comprising setting the first shutter pointer to the second width when the first shutter pointer reaches the bottom of the frame.

12. The method of claim 11, further comprising disabling the second shutter pointer when the first shutter pointer is set to the second width.

13. A method for controlling an active pixel sensor (APS) array, the method comprising:
   selectively releasing at least a first row of the APS array from reset;
   selectively enabling a read out of at least a second row of the APS array, the at least a second row of the APS array being located a first predetermined number of rows away from the at least a first row, the first predetermined number of rows defining a first integration period of the APS array; and
   pointing to at least a third row of the APS array while readout of the second row of the APS array is enabled according to the first integration period, wherein the at least a third row of the APS array is located a second predetermined number of rows away from the at least a second row, and wherein the second predetermined number of rows defines a second integration period different from the first integration period.

14. The method of claim 13, further comprising:
   pointing to at least a fourth row of said APS array, wherein the at least a fourth row of the APS array is located a third predetermined number of rows away from the at least a second row, and wherein the third predetermined number of rows defines a third integration period different from the second integration period.

15. The method of claim 13, further comprising:
   integrating at least one row of the APS array; and
   resetting the remaining rows other than the at least one row of the APS array.

16. The method of claim 13, further comprising integrating at least one row of the APS array while configuring the rows other than said at least one row of the APS array to be reset.

* * * * *

UNITED STATES PATENT AND TRADEMARK OFFICE
CERTIFICATE OF CORRECTION

PATENT NO. : 7,573,516 B2
APPLICATION NO. : 10/958592
DATED : August 11, 2009
INVENTOR(S) : Krymski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Seventh Day of September, 2010

David J. Kappos
*Director of the United States Patent and Trademark Office*